United States Patent
Hempelmann et al.

(10) Patent No.: US 7,693,883 B2
(45) Date of Patent: Apr. 6, 2010

(54) ONLINE DATA VOLUME DELETION

(75) Inventors: Henrik Hempelmann, Havelberg (DE); Torsten Strahl, Kleinmachnow (DE)

(73) Assignee: SAP AG, Walldorf (DE)

( * ) Notice: Subject to any disclaimer, the term of this patent is extended or adjusted under 35 U.S.C. 154(b) by 308 days.

(21) Appl. No.: 11/342,898

(22) Filed: Jan. 30, 2006

(65) Prior Publication Data

US 2007/0192273 A1 Aug. 16, 2007

(51) Int. Cl.
G06F 17/30 (2006.01)

(52) U.S. Cl. .................. 707/204; 707/205; 707/202; 707/203; 707/9; 711/113; 711/118; 711/128; 711/129; 711/144; 711/145; 714/7

(58) Field of Classification Search ............. 707/205, 707/202, 203, 204, 9; 711/113, 118, 128, 711/129, 144, 145; 714/7
See application file for complete search history.

(56) References Cited

U.S. PATENT DOCUMENTS

| | | | | |
|---|---|---|---|---|
| 5,265,227 A | * | 11/1993 | Kohn et al. ............... 711/207 |
| 5,341,429 A | * | 8/1994 | Stringer et al. ............. 705/52 |
| 5,742,792 A | * | 4/1998 | Yanai et al. ................ 711/162 |
| 6,240,527 B1 | * | 5/2001 | Schneider et al. ............ 714/21 |
| 6,944,711 B2 | * | 9/2005 | Mogi et al. ................. 711/113 |
| 7,290,108 B2 | * | 10/2007 | Maruyama et al. .......... 711/163 |
| 2001/0011347 A1 | * | 8/2001 | Narayanaswamy et al. .... 713/2 |
| 2003/0163655 A1 | * | 8/2003 | McKean et al. ............. 711/154 |
| 2004/0210713 A1 | * | 10/2004 | Kanai ........................ 711/113 |
| 2004/0267835 A1 | * | 12/2004 | Zwilling et al. ............. 707/202 |
| 2005/0055603 A1 | * | 3/2005 | Soran et al. .................... 714/7 |
| 2006/0031634 A1 | * | 2/2006 | Nagai et al. ................. 711/113 |
| 2007/0101079 A1 | * | 5/2007 | Macintyre et al. ........... 711/163 |

* cited by examiner

*Primary Examiner*—Khanh B Pham
*Assistant Examiner*—Syling Yen
(74) *Attorney, Agent, or Firm*—Buckley, Maschoff & Talwalkar LLC

(57) ABSTRACT

A system to delete a data volume may include storage of a plurality of data pages of the data volume of a data area into a cache, prevention of writing of data pages to the data volume, and designation of each of the plurality of data pages in the cache as modified. The system may also include writing of all data pages in the cache that are designated as modified to a respective location in one or more other data volumes of the data area, and updating, for each of the written data pages, a converter page of the cache to associate the written data page with its respective location in the one or more other data volumes.

26 Claims, 18 Drawing Sheets

```
                                                    ┌─ 1276
┌──────────────────────────────────────────┐
│ *  Pages 0-1,999 | Version 9 | Block: 2/2538 │
├──────────────────────────────────────────┤
│        PageNo: 111   Block 2/504         │
├──────────────────────────────────────────┤
│        PageNo: 112   Block 2/2350        │
└──────────────────────────────────────────┘

┌─ 1278
┌──────────────────────────────────────────────┐
│ Pages 12,000-13,999 | Version 9 | Block: 3/150 │
├──────────────────────────────────────────────┤
│         PageNo: 12345   Block 2/3500         │
├──────────────────────────────────────────────┤
│         PageNo: 12346   Block 3/1250         │
└──────────────────────────────────────────────┘
```

FIG. 12

```
                                                    ┌─ 1376
┌──────────────────────────────────────────┐
│ *  Pages 0-1,999 | Version 10 | Block: 3/638 │
├──────────────────────────────────────────┤
│        PageNo: 111   Block 2/504         │
├──────────────────────────────────────────┤
│        PageNo: 112   Block 2/2350        │
└──────────────────────────────────────────┘

┌─ 1378
┌──────────────────────────────────────────────┐
│ * Pages 12,000-13,999 | Version 10 | Block: 2/546 │
├──────────────────────────────────────────────┤
│         PageNo: 12345   Block 2/3500         │
├──────────────────────────────────────────────┤
│         PageNo: 12346   Block 3/1250         │
└──────────────────────────────────────────────┘
```

FIG. 13

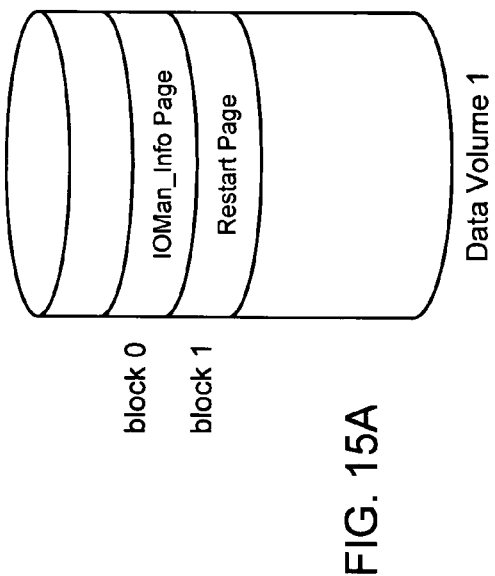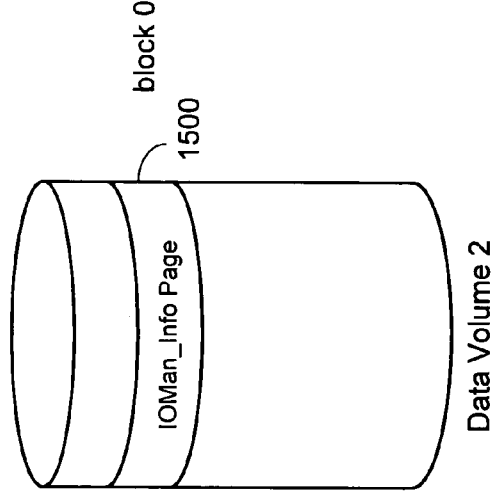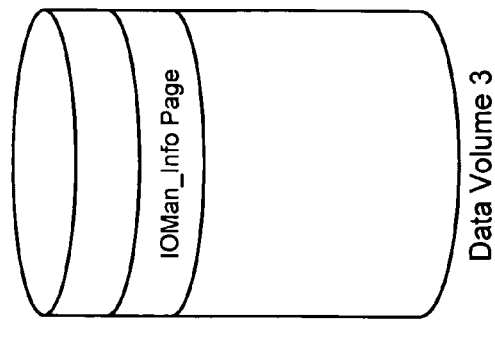
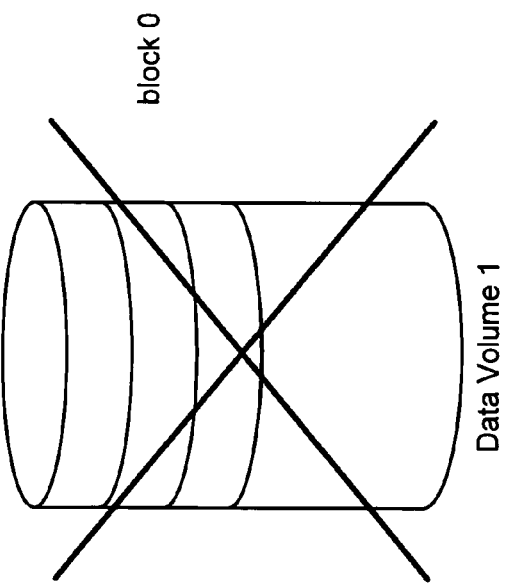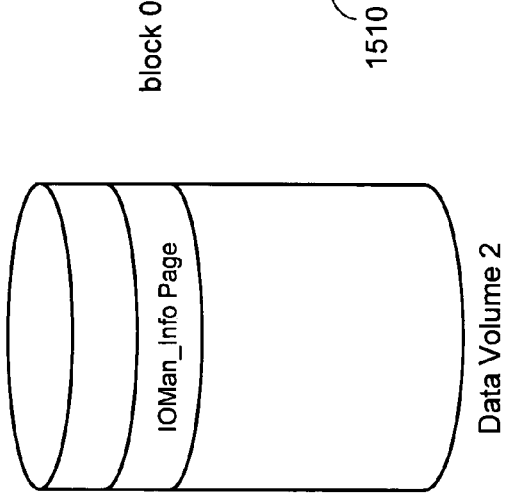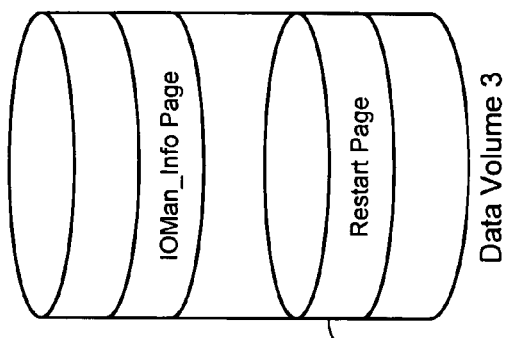
FIG. 15A
FIG. 15B

1700 ⬎

```
                    Configuration File
MAXDATAVOLUMES              8
VOLUMENO_BIT_COUNT          8
DATA_VOLUME_NAME_001        /sapdb/myDB/data/DISKD001
DATA_VOLUME_SIZE_001        1000
DATA_VOLUME_NAME_002        /sapdb/myDB/data/DISKD002
DATA_VOLUME_SIZE_002        1000
DATA_VOLUME_NAME_003        /sapdb/myDB/data/DISKD003
DATA_VOLUME_SIZE_003        1000

MAXLOGVOLUMES               4
LOG_VOLUME_NAME_001         /sapdb/myDB/log/DISKL001
LOG_VOLUME_SIZE_001         500
```

```
                    Configuration File
MAXDATAVOLUMES              8
VOLUMENO_BIT_COUNT          8
DATA_VOLUME_NAME_002        /sapdb/myDB/data/DISKD002
DATA_VOLUME_SIZE_002        1000
DATA_VOLUME_NAME_003        /sapdb/myDB/data/DISKD003
DATA_VOLUME_SIZE_003        1000

MAXLOGVOLUMES               4
LOG_VOLUME_NAME_001         /sapdb/myDB/log/DISKL001
LOG_VOLUME_SIZE_001         500
```

ONLINE DATA VOLUME DELETION

FIELD

Some embodiments relate to managing data volumes of a database system. In particular, some embodiments concern releasing and deleting a data volume of a database system while the database system is online.

BACKGROUND

A database system may store data across several data volumes of a data area. During operation of the database system, it may occasionally become desirable to delete a data volume from the data area in order to reduce a size of the data area and/or to otherwise reconfigure the data area. Conventional techniques necessitate the database system to enter an offline mode prior to deleting a data volume. Since the database system cannot be read or written in an offline mode, conventional techniques for deleting a data volume are unsuitable for some applications.

Conventional techniques for deleting a data volume pose additional problems if the data volume stores a restart page for the database system. A restart page may include information used to start the database system and reconstruct its underlying structures. Upon start-up, the database system looks for the restart page at a particular location of a particular data volume. The database system will therefore fail to start properly if the data volume including the restart page has been previously deleted.

Systems are therefore desired for deleting a data volume of a database system while the database system remains in an online operational mode. Systems to perform such deletion and to efficiently move and access a restart page of the deleted data volume are further desired.

BRIEF DESCRIPTION OF THE DRAWINGS

FIG. 12 includes tabular representations of portions of converter updated to reflect new data page addresses according to some embodiments.

FIG. 13 includes tabular representations of portions of converter pages in updated to reflect their new locations according to some embodiments.

FIG. 15A illustrates a location of a restart page in a data area according to some embodiments.

FIG. 15B illustrates deletion of a data volume of a data area and relocation of a restart page according to some embodiments.

FIG. 17A illustrates a configuration file of a database prior to deletion of a data volume according to some embodiments.

FIG. 17B illustrates a configuration file of a database volume after deletion of a data volume according to some embodiments.

DETAILED DESCRIPTION

Figure 1:
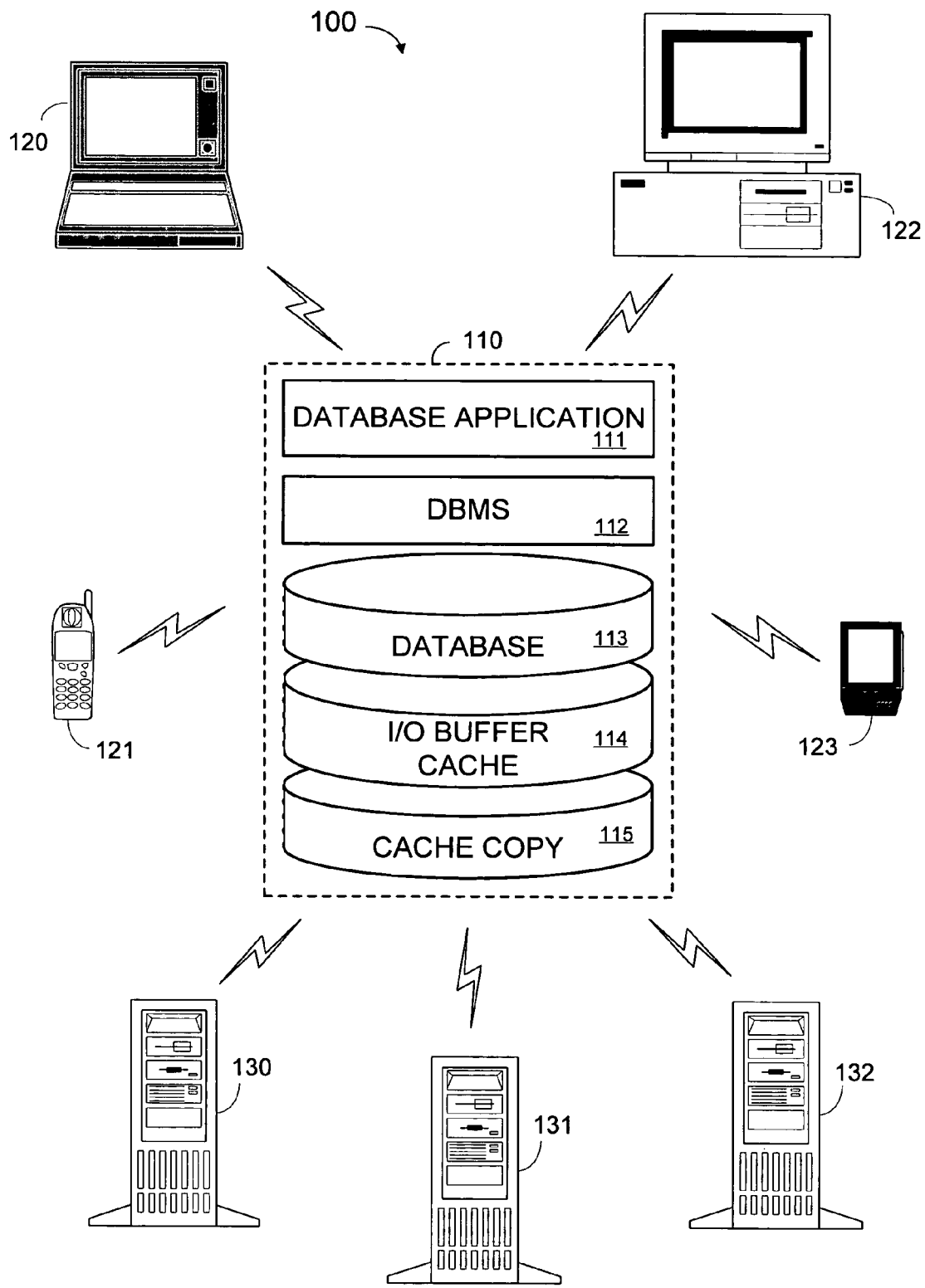
FIG. 1 is a block diagram of a hardware architecture according to some embodiments.

FIG. 1 is a block diagram of system 100 according to some embodiments. System 100 illustrates a client-server database environment including application/database server 110, client devices 120 through 123, and data sources 130 through 132. Other system topologies may be used in conjunction with other embodiments.

Server 110 may operate to receive, store, manage and provide data. Such data may be received from sources such as data sources 130 through 132 and/or generated by server 110. The data may be provided to client devices 120 through 123 in response to requests received therefrom. Server 110 of system 100 includes database application 111, database management system (DBMS) 112, database 113, input/output (I/O) buffer cache 114 and cache copy 115.

Database application 111 may provide business monitoring, inventory control, online shopping, and/or any other suitable functions via interactions with other elements of server 110. According to some embodiments, database application 111 communicates with DBMS 112 over one or more interfaces provided by DBMS 112. Database application 111 may, in turn, support client applications executed by client devices 120 through 123. Such a client application may simply comprise a Web browser to access and display reports generated by database application 111. In this regard, server 110 may comprise a Web server to manage interactions with client devices 120 through 123.

DBMS 112 may comprise any system for managing a database instance that is or becomes known. Generally, DBMS 112 may receive requests for data (e.g., Structured Query Language (SQL) requests from database application 111), may retrieve requested data from database 113, and may return the requested data to the requestor. DBMS 112 may also perform start-up, logging, recovery, management, optimization, monitoring and other database-related tasks. DBMS 112 may operate to delete a data volume from database 113 according to some embodiments described herein.

Database 113 may comprise one or more disparate systems for storing data, therefore DBMS 122 may comprise one or more systems for retrieving stored data. According to some embodiments, database 113 is implemented as any suitable collection of data that may be accessed by a computer program to select particular data from the collection.

The data of database 113 may include data records and associated index entries (i.e. application data), as well as configuration files, database parameters, paths, user information and any other suitable information. In some embodiments, database 113 is an element of an Online Transaction Processing (OLTP) database instance. An OLTP database instance may be suited for processing individual transactions quickly within an environment consisting of a large number of users and a large database.

During database execution, various elements of the database are stored in I/O buffer cache 114. These elements may include recently-accessed pages of application data, converter pages, database catalog objects and/or a log queue. Cache copy 115 comprises a copy of all or a portion of cache 114. Cache copy 115 may comprise a liveCache™ database instance that facilitates object-oriented manipulation of the copied cache data.

Server 110 may include other unshown elements that may be used during operation thereof, such as any suitable program code, scripts, or other functional data that is executable to interface with other elements of system 100, other applications, other data files, operating system files, and device drivers. These elements are known to those skilled in the art, and are therefore not described in detail herein.

Client devices 120, 121, 122 and 123 are illustrated as a laptop computer, a telephone, a desktop computer, and a personal digital assistant, respectively. Generally, each of client devices 120 through 123 may comprise any combination of hardware and/or software for communicating with server 110. This communication may comprise transmitting a request for information to server 110 and receiving a response that includes data stored in database 113. Each of client devices 120 through 123 may provide any suitable client application such as a Web browser or a Java applet. In this regard, client devices 120 through 123 may be connected to server 110 through the Internet or through an Intranet.

Data sources 130 through 132 may comprise any sources of any data that may provide data to server 110. The data may be pushed to server 100 and/or provided in response to queries received therefrom. One or more of data sources 130 through 132 may comprise a back-end data environment employed in a business or industrial context. Data sources 130 through 132 may therefore comprise many disparate hardware and software systems, some of which are not interoperational with one another.

Two or more of the elements of system 100 may be located remote from one another and may communicate with one another via a network and/or a dedicated connection. Moreover, each displayed element of system 100 may comprise any number of hardware and/or software elements, some of which are located remote from each other.

Elements described herein as communicating with one another are directly or indirectly capable of communicating over any number of different systems for transferring data, including but not limited to shared memory communication, a local area network, a wide area network, a telephone network; a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
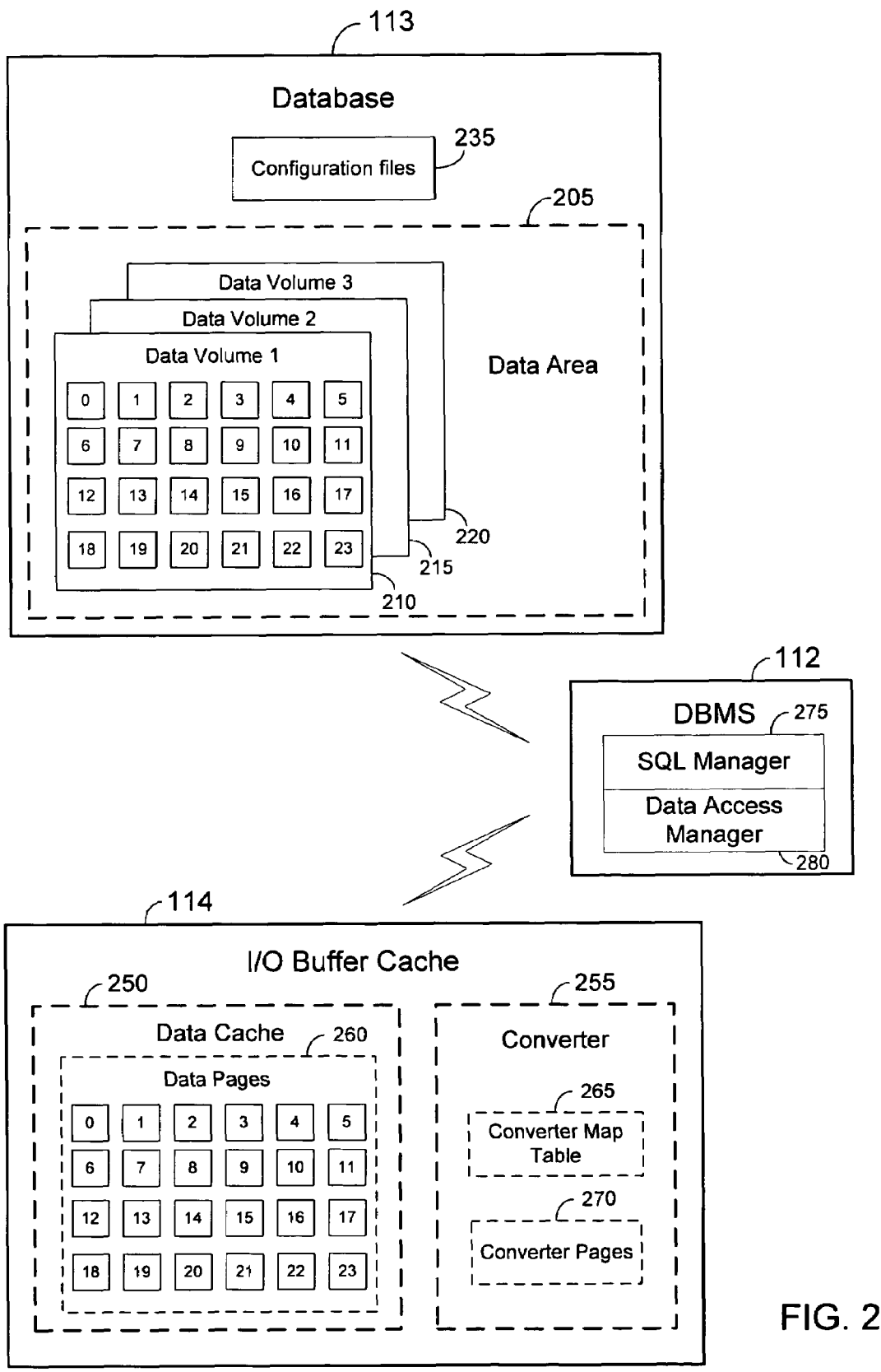
FIG. 2 is a block diagram of a database system according to some embodiments.

FIG. 2 is a detailed block diagram of elements 112 through 114 of server 100 according to some embodiments. Some embodiments will be described below with reference to the details illustrated in FIG. 2 and described below.

Data area 205 of database 113 includes data volumes 210 through 220. Each of data volumes 210 through 220 comprises a logical group of physical memory units. For example, a data volume may comprise a portion of a physical hard disk, an entire physical hard disk, or a storage system composed of several physical hard disks. Data area 205 may include more or fewer data volumes than illustrated in FIG. 2.

Each of data volumes 210 through 220 is logically divided into storage areas known as blocks. According to some embodiments, a block holds eight kilobytes of data. Although twenty-four blocks are illustrated in conjunction with data volume 210, embodiments may define more or fewer blocks per data volume.

Database 113 and cache 114 may manage data in basic units (i.e. pages) having the same size as a block. Accordingly, a page may be accessed by referencing a volume and a block address in which the page is stored.

Data area 205 also includes a database catalog including metadata of objects that are stored within data volumes 210 through 220. These objects may include tables, indexes, views, users and user groups.

Database 113 may also store log volumes in a log area (not shown). Such log volumes store information indicating changes made to stored data. The information may be used for returning database 113 to a consistent state after a system crash.

Configuration files 235 of database 113 store parameters for defining properties of database 113. These parameters may specify a size and physical location of each data volume and log volume, and a maximum number data volumes in data area 205.

I/O buffer cache 114 is used to manage memory that is available for I/O operations. I/O buffer cache 114 includes data cache 250 and converter 255. I/O buffer cache 114 may reside in Random Access Memory of server 110.

Data cache 250 stores pages from data area 205 that have been recently read or write-accessed. If a transaction changes a page, the changed page is initially saved in data cache 250 while the previous version of the page remains in data area 205. At various intervals (e.g., if data cache 250 reaches a threshold fullness or if a savepoint is scheduled), the changed data page is written to a location of one of data volumes 210 through 220. The foregoing process will be described in more detail below.

Converter 255 associates logical page numbers with physical addresses. For a given page number, converter 255 indicates a block address (e.g., a data volume number and an offset) at which an associated page is stored in data area 205. In a case that DBMS 112 cannot find a page in data cache 250, converter 255 is accessed to determine a location of the page in data area 205 based on the page's number.

Converter 255 includes converter map table 265 and converter pages 270 according to some embodiments. Each of converter pages 270 includes a respective data volume and a block address for each of several logical page numbers. For each logical page number, converter map table 265 specifies a memory address of I/O buffer cache 114 at which an associated converter page 270 is located. Each of converter pages 270 also indicates a data volume and a block address where it is stored in data area 205. Converter map table 265 and converter pages 270 will be discussed in more detail with respect to FIG. 4.

Data cache 250 and converter 255 are illustrated separately in FIG. 2 for the sake of clarity. According to some embodiments, data cache 250 and converter 255 might not comprise separate, contiguous memory addresses of I/O buffer cache 114. For example, converter pages 270 may be interspersed among data pages 260 throughout I/O buffer cache 114.

According to some embodiments, a size of I/O buffer cache 114 may be configured but data cache 250 and converter 255 are dimensioned dynamically. For example, if converter 255 grows and requires more pages, converter 255 is allocated more pages from I/O buffer cache 114. If I/O buffer cache 114 does not include any more pages, memory allocated to data cache 260 is decreased and made available to converter 255.

DBMS 112 is shown in communication with database 113 and I/O buffer cache 114. In some embodiments, DBMS 112 includes a kernel which in turn includes SQL manager 275 and data access manager 280. SQL manager 275 processes received SQL statements and data access manager 280 manages access to stored data.

Figure 3:
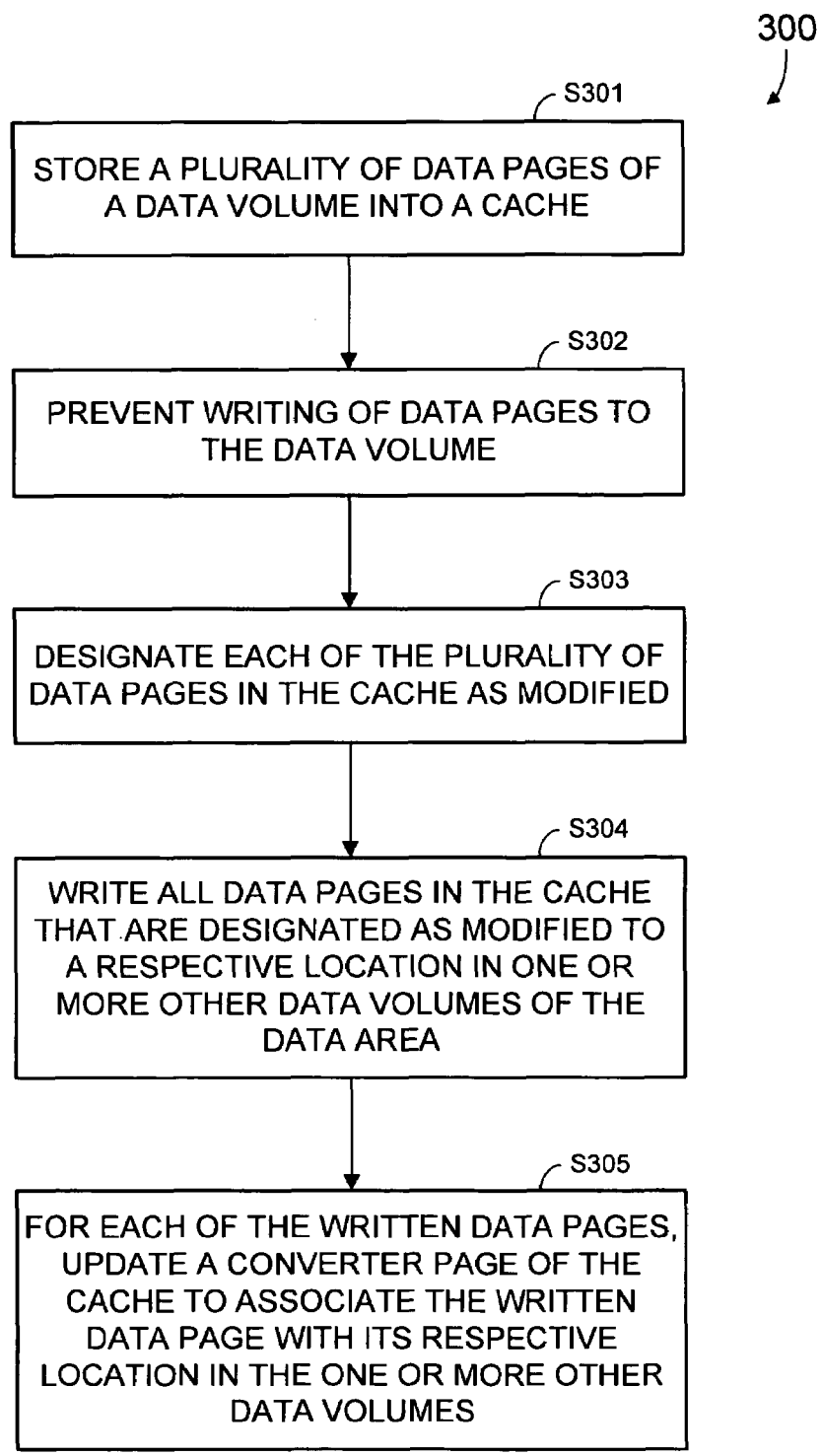
FIG. 3 is a flow diagram of program code according to some embodiments.

FIG. 3 is a flow diagram of process 300 according to some embodiments. Some embodiments of process 300 may provide deletion of a data volume while database 113 is in an online operational state. In some embodiments, server 110 executes program code of DBMS 112 to perform process 300.

Process 300 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In some embodiments, an apparatus stores program code to manage a data volume.

Initially, at S301, a plurality of data pages of a data volume is stored into a cache. The data volume of interest is a data volume that is to be deleted. A data volume may be deleted in order to reduce the size of its data area, to free a physical memory unit, to reconfigure a data area, and for other reasons.

With reference to FIG. 2, it will be assumed that a command to delete data volume 215 is received prior to S301. As described above, data pages as well as converter pages are stored at respective block addresses of data volume 215. Some embodiments may store the data pages of data volume 215 in cache 114 at S301 by reading each of the data pages.

Next, at S302, writing of data pages to the data volume is prevented. S302 may comprise designating the subject data volume as "read-only" or any other suitable action that suspends writing of data pages to the data volume.

Each of the plurality of data pages in the cache is designated as modified at S303. Continuing with the present example, each of the data pages of data volume 215 that are stored cache 114 is designated as modified at S303. Cache 114 provides for such a designation in order to support a "shadow memory" feature.

A brief description of the shadow memory feature follows. To modify a page in accordance with the feature, the page is read from a block address of a data volume, the page is modified, and a log entry is written. The modified page is stored in cache 114, the modified page is designated as modified, and the original "last known good" page remains at the block address of the data volume from which it was read. Once a number of modified pages in cache 114 reaches a threshold amount, or after passage of a designated time interval, all pages designated as modified are written to data area 205.

The modified pages are not written to the block addresses of the data volumes from which they were read. Rather, the original unmodified page remains designated a "last known good" page at its respective block address and its modified version is written to a new block address of data volumes 210 through 220. To recover from a system crash, the modified pages stored in data area 205 are ignored and data area 205 is reconstructed based on the "last known good"-designated pages and the log entries.

A savepoint is periodically initiated to convert the modified pages stored in data area 205 to "last known good" pages and to free the blocks used by the existing "last known good" pages for writing pages thereto. At a savepoint, all pages designated as modified in cache 114 are written to data area 205 as described above. Once all modified pages are written, the "last known good" pages associated with the modified pages are released so that their associated block addresses may be overwritten.

Returning to process 300, the data pages in the cache that are designated as modified are written at S304 to a respective location in one or more other data volumes of the data area. The writing of pages at S304 may be facilitated by the shadow memory feature. More particularly, the shadow memory feature automatically writes modified pages of cache 114 to new locations in data area 205. However, since writing of pages to data volume 215 was prevented in S302, the modified pages are written only to other data volumes 210 and 220.

For each of the data pages written at S304, a converter page is updated at S305. A converter page is updated at S305 to associate a written data page with its respective location in the one or more other data volumes. As described above, each of converter pages 270 is associated with several logical page numbers, and maps a data volume and a block address to each associated logical page number. The converter pages 270 that are associated with the data pages written at S304 are therefore updated at S305 to map the data pages to the locations in the one or more other data volumes to which the pages were written.

S304 and S305 occur at a savepoint according to some embodiments. Consequently, each data page of data volume 210 is designated a "last known good" data page and may be released after process 300. Moreover, data volume 210 may be deleted from data area 205 after process 300 by modifying configuration files 235 appropriately. FIGS. 6A through 17B provide a detailed example of such a modification and of some embodiments of process 300.

Figure 4:
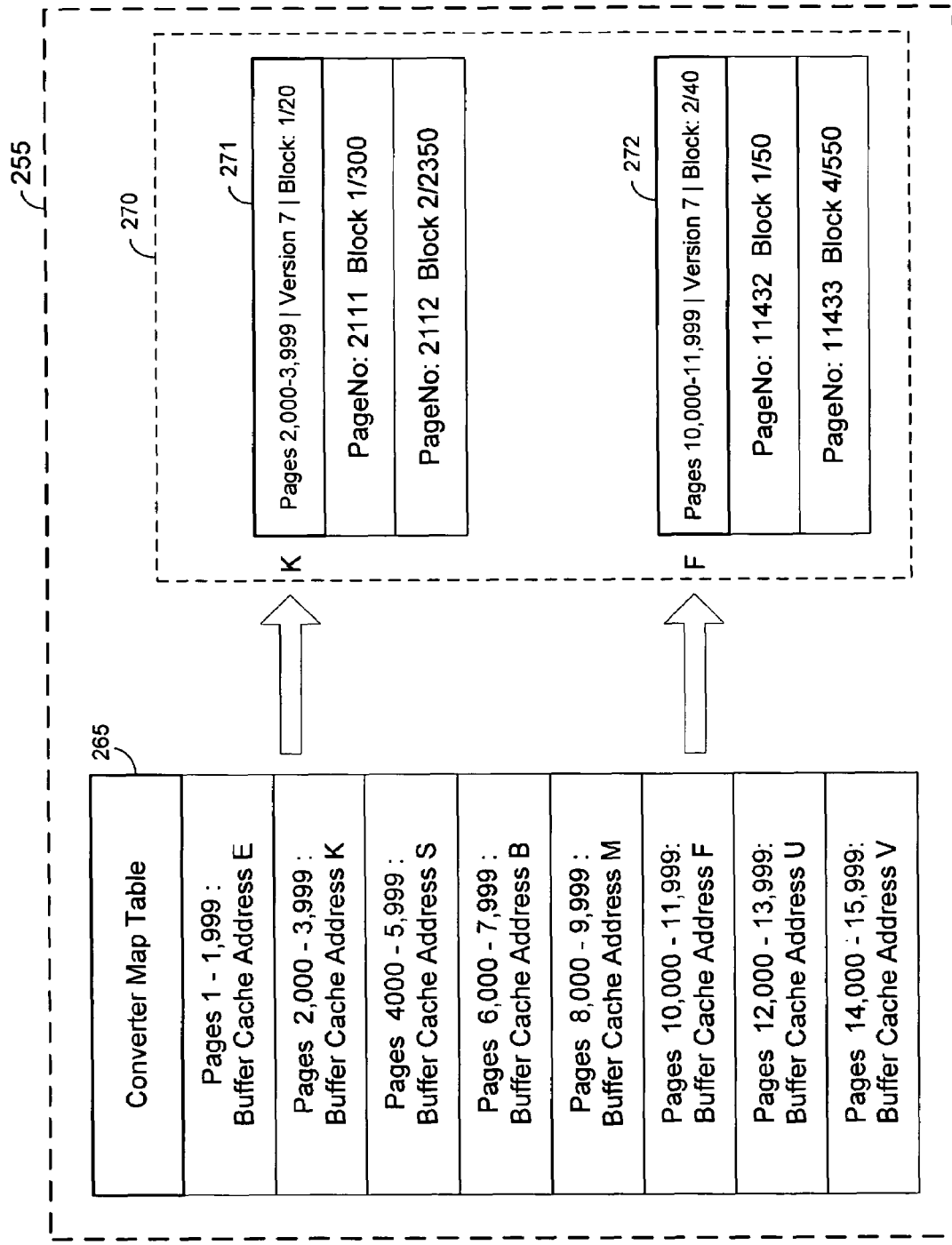
FIG. 4 illustrates components of a converter in a cache according to some embodiments.

FIG. 4 illustrates tabular representations of converter map table 265 and converter pages 270 to provide background for the forthcoming description. As shown, converter map table 265 specifies several ranges of logical page numbers. Converter map table 265 associates a memory address of I/O buffer cache 114 with each specified range. As also shown, stored at each memory address is a converter page 270 that lists page numbers in the range associated with each address.

For example, converter page 271 indicates that a data page associated with logical page number 2111 is stored at block 300 of data volume 1. Converter pages 271 and 272 also indicate locations of data area 205 which store "last known good" versions of converter pages 271 and 272. For example, the "last known good" version of converter page 272 is stored at block 40 of data volume 2. The version number specified in converter page 272 represents a last savepoint at which the "last known good" version was written to block 40 of data volume 2.

Figure 5:
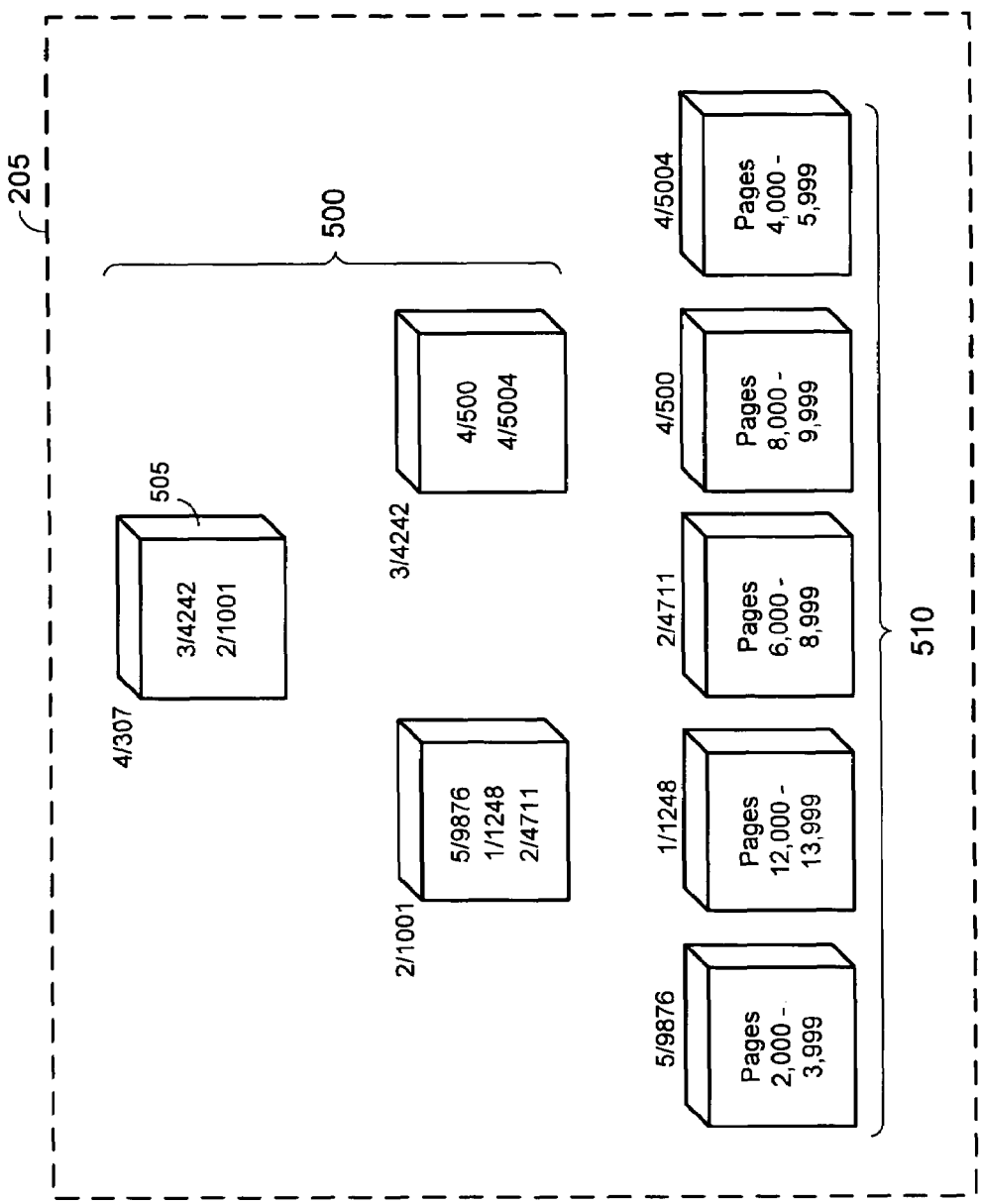
FIG. 5 illustrates components of a converter in a data area according to some embodiments.

FIG. 5 illustrates converter index pages 500 and converter pages 510 of data area 205. Converter pages 510 represent the "last known good" converter pages mentioned with respect to FIG. 4. Index pages 500 may be used to locate a converter page 510 and to locate a data page in data area 205 based on the located converter page 510. Each index page 500 includes block addresses of one or more other index pages or of a converter page 510. By virtue of this arrangement, any of converter pages 510 (and any associated data pages) may be located in data area 205 based only on the block address of converter root page 505.

Figure 6A:
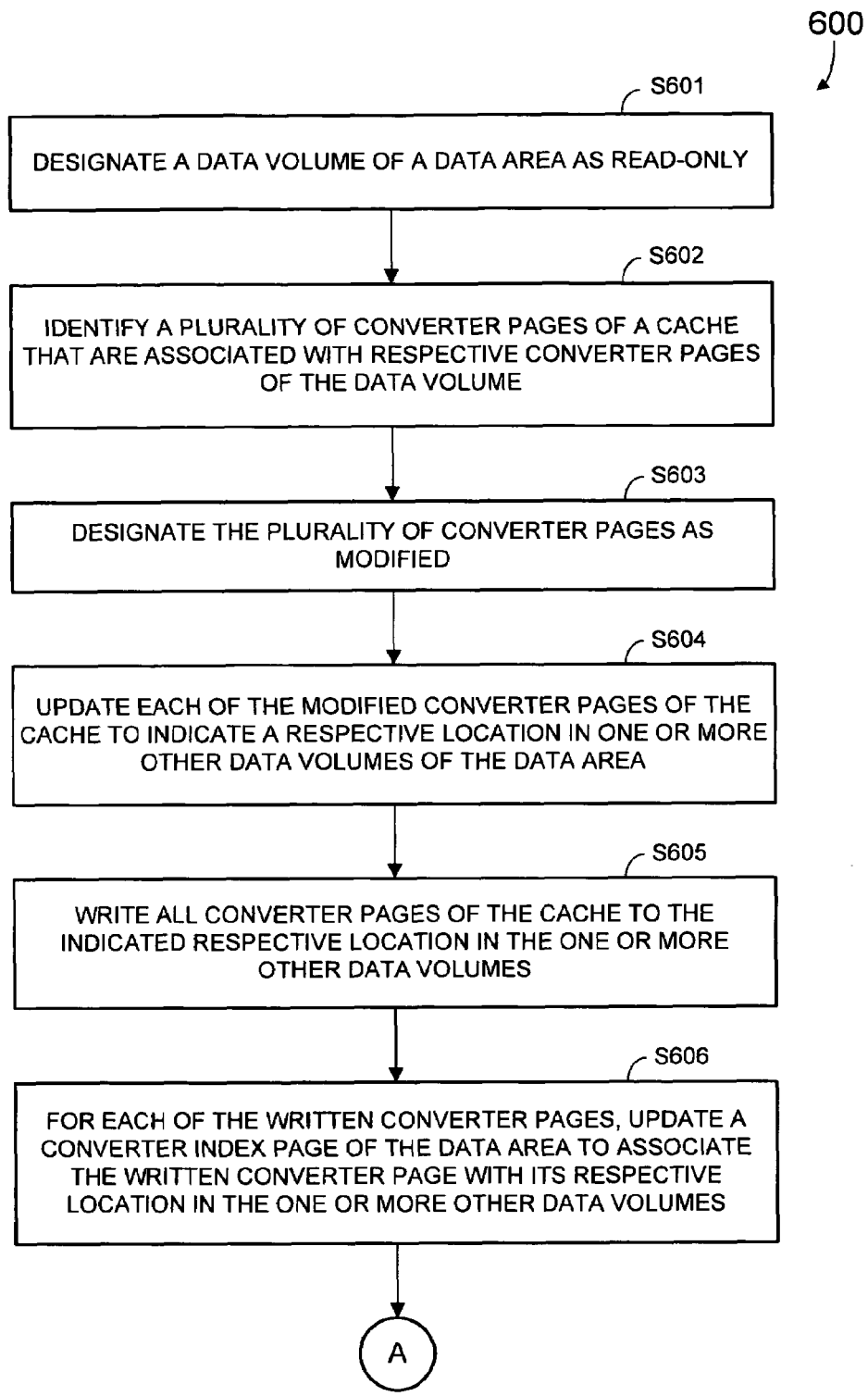
FIGS. 6A through 6C comprise a flow diagram of program code according to some embodiments.
Figure 6B:
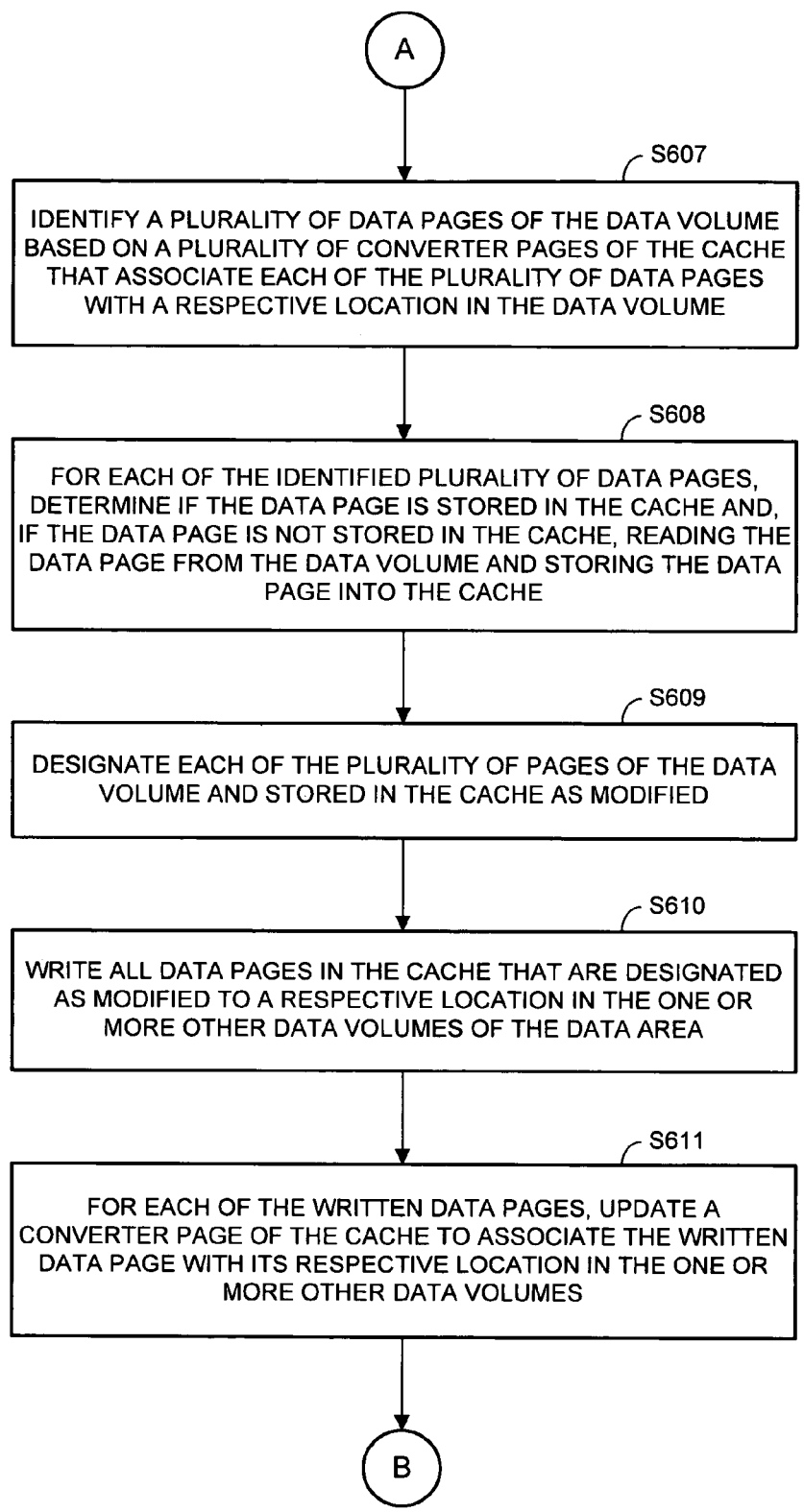
Figure 6C:
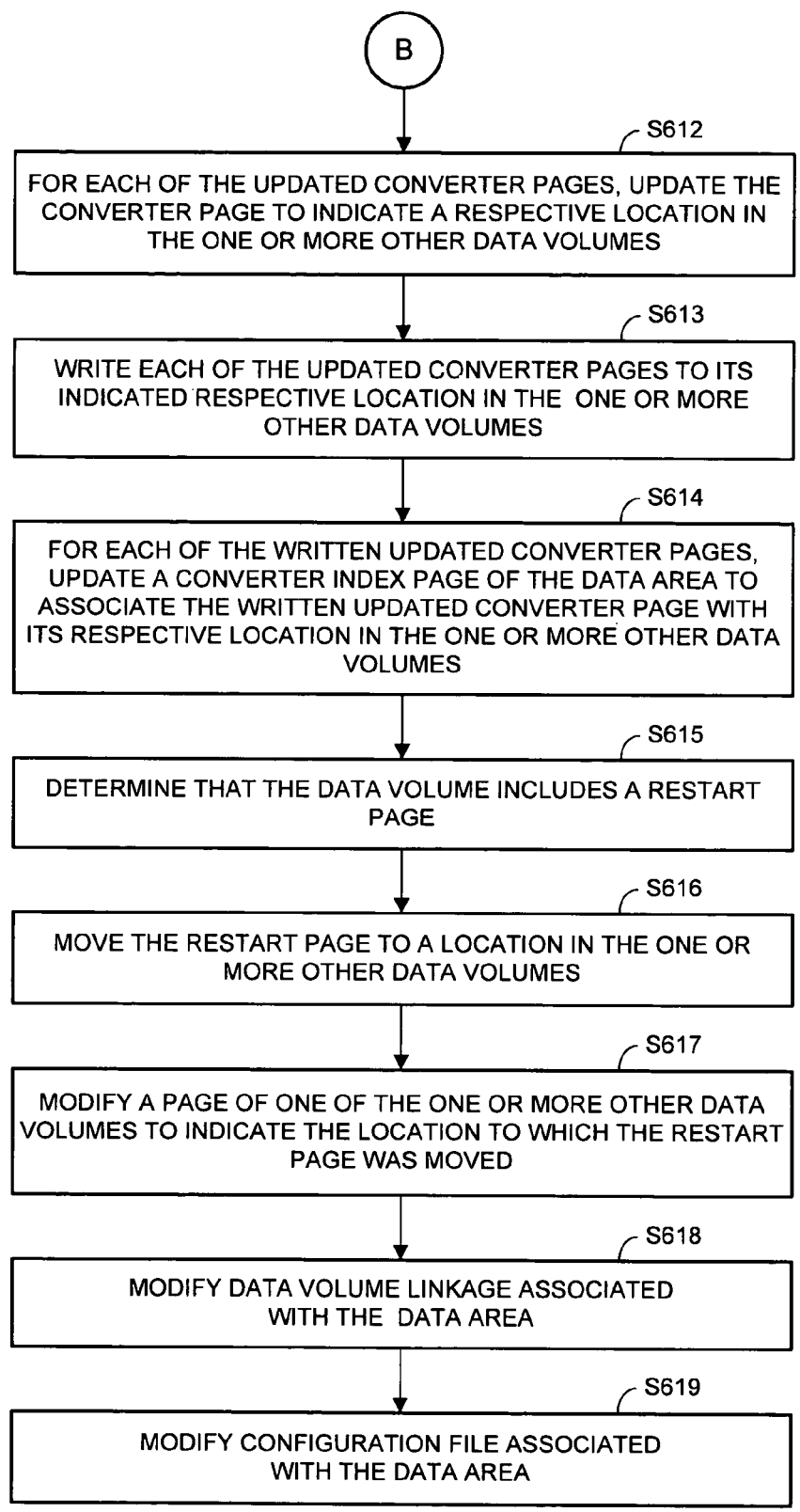

FIGS. 6A through 6C comprise a flow diagram of process 600 according to some embodiments. Process 600 may be executed to delete a data volume. In some embodiments, server 110 executes program code of DBMS 112 to perform process 600.

A data volume to be deleted is designated as read-only at S601. DBMS 112 may include a free block management component for determining block addresses of data area 205 to which pages may be written. According to some embodiments of S601, the free block management component is configured so that no pages are written to block addresses of the data volume.

Figure 7:
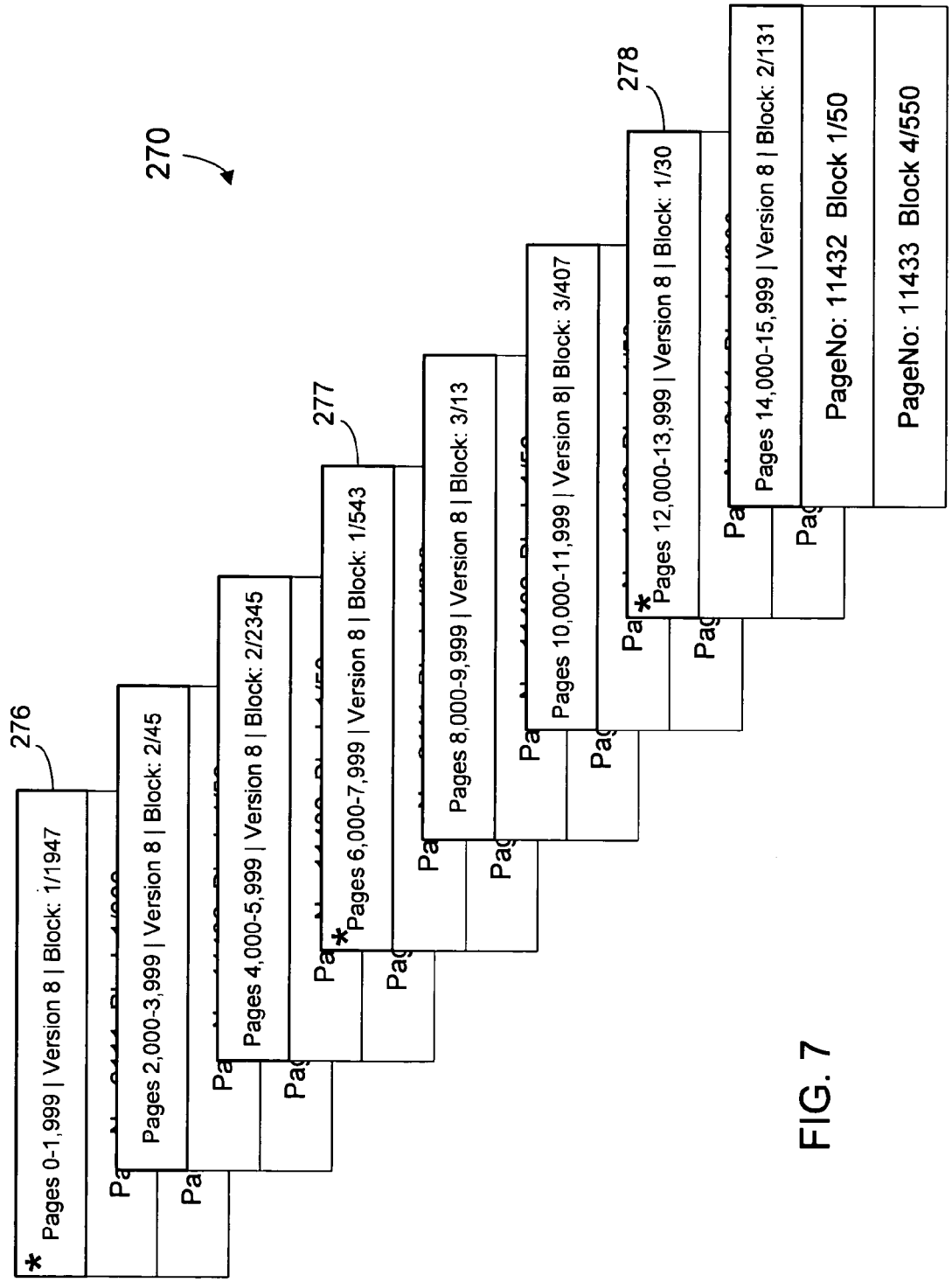
FIG. 7 includes tabular representations of portions of converter pages in a cache according to some embodiments.

A plurality of converter pages of a cache is identified at S602. The identified pages consist of pages that are associated with converter pages of the data volume. FIG. 7 illustrates tabular representations of portions of converter pages 270 stored in cache 114. Pages 270 may be located in cache 114 using memory addresses associated therewith in converter map table 265. Converter pages 276, 277 and 278 are associated with respective converter pages stored at blocks 1947, 543 and 30, respectively, of data volume 1. Accordingly, converter pages 276, 277 and 278 may be identified at S602.

The identified plurality of converter pages are designated as modified at S603. This designation is illustrated in FIG. 7 by an asterisk located on each of converter pages 276, 277 and 278. Any suitable system to designate a converter page as modified may be used at S603.

Some of the converter pages identified at S602 may have been previously modified and not written to data area 205. Such converter pages would already be designated as modified prior to S603. These modified converter pages would differ from their associated converter pages stored in the data volume, while any of the identified converter pages that were not designated as modified prior to S603 would be identical to their associated converter pages stored in the data volume.

Figure 8:
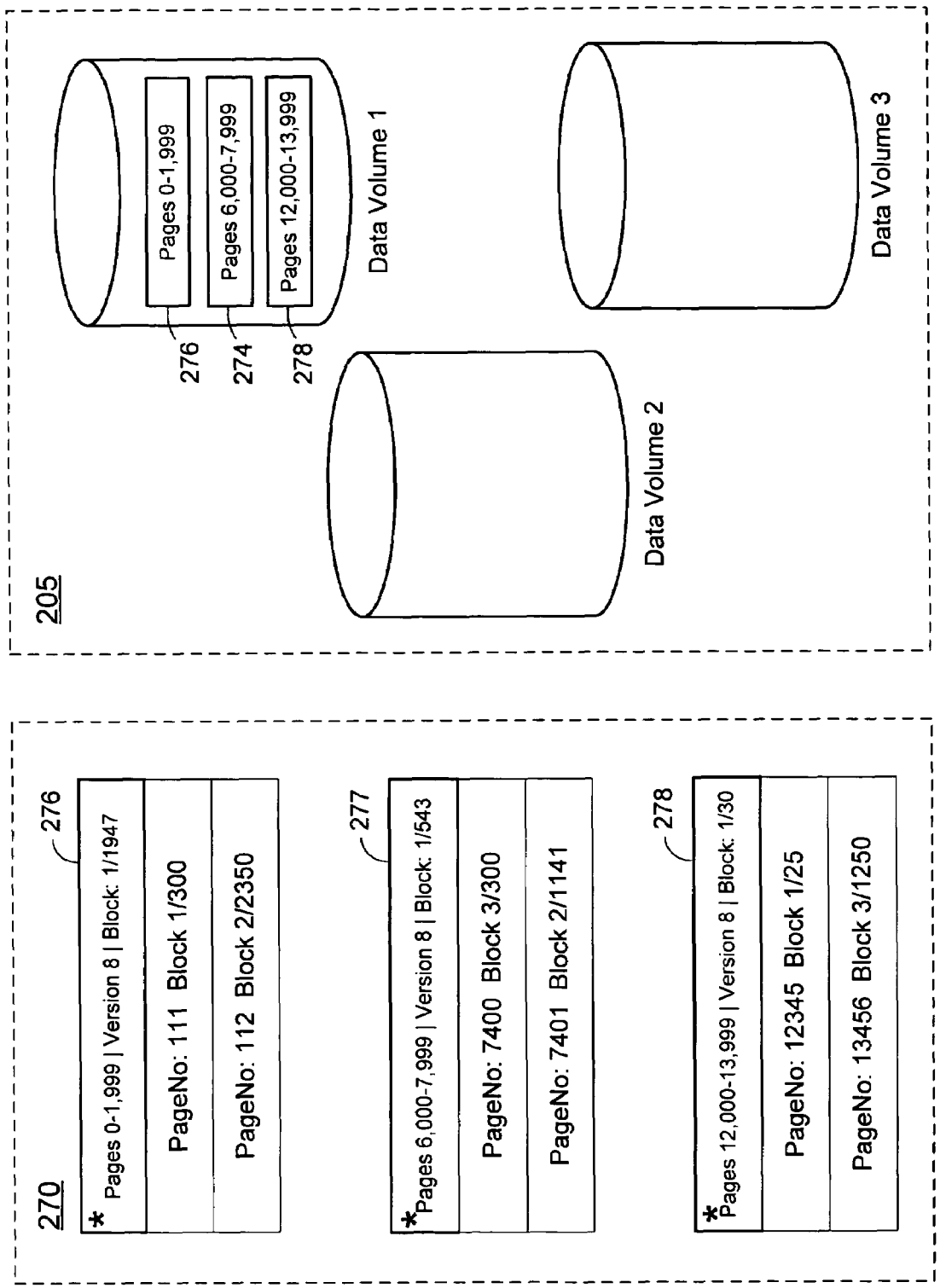
FIG. 8 illustrates writing of converter pages to respective locations of data volumes according to some embodiments.

FIG. 8 illustrates converter pages 276, 277 and 278 and their associated converter pages 276, 274 and 278 of data volume 1. Converter page 277 is a modified version of converter page 274 that has not yet been written to data area 205, while converter pages 276 and 278 of converter pages 270 are identical to their associated converter pages stored in data volume 1.

Next, at S604, each of the converter pages of the cache that is designated as modified is updated to indicate a respective location in one or more other data volumes. The respective location of an updated converter page indicates where the converter page is to be subsequently written. By virtue of S601, the free block management component may ensure that the converter pages are updated to indicate only locations in other data volumes 210 and 220 of data area 205. According to some embodiments, S604 occurs during execution of a savepoint.

Figure 9:
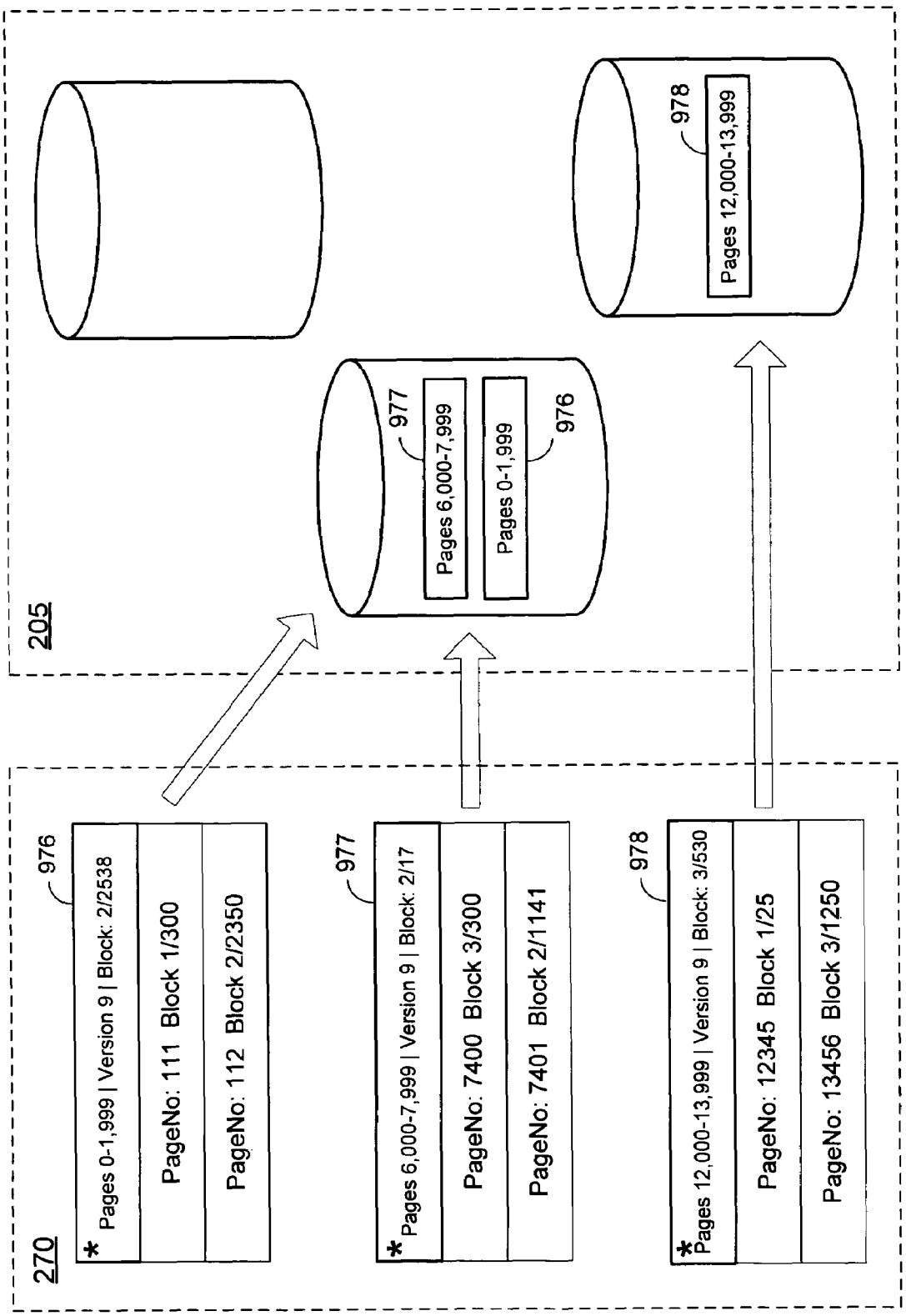
FIG. 9 illustrates updating of written converter pages based on respective locations in data volumes according to some embodiments.

FIG. 9 continues the present example by showing converter pages 976 through 978 of converter pages 270. Converter pages 976 through 978 are versions of converter pages 276 through 278 that have been updated according to S604. As such, each of converter pages 976 through 978 indicates a location in one of data volume 2 or data volume 3. A version number of each of converter pages 976 through 978 has also been updated to reflect execution of the present savepoint.

The converter pages of the cache are written to their indicated locations in the one or more other data volumes at S605. The arrows of FIG. 9 illustrate writing the converter pages to their indicated locations according to some embodiments of S605. FIG. 9 also shows that the blocks of data volume 1 which previously stored the "last known good" versions of the written converter pages have been freed at the completion of the savepoint.

For each of the converter pages written at S605, a converter index page is updated at S606. The converter index page is updated to associate the written converter page with its new location in the data area. For example, one or more of converter index pages 500 of FIG. 5 would be updated in S606 to reflect a changed location of any of converter pages 510 within data area 205.

A plurality of data pages of the data volume to be deleted is identified at S607. The identification is based on converter pages of the cache that associate each of the data pages with the data volume. According to some embodiments, a location of each of converter pages 270 is determined and S607 based on converter map table 265. Each of converter pages 270 is examined to locate each logical page number that is associated with a block address of data volume 1.

At S608, it is determined whether each identified data page is stored in the cache. Each identified data page that is not stored in the cache is read from the data volume using its associated block address and stored in the cache. Accordingly, after completion of S608, the cache includes either an identical or a modified version of each data page of the data volume to be deleted. Each data page is then designated as modified at S609, regardless of whether the data page is an identical or modified version of its associated page in the data volume.

Figure 10:
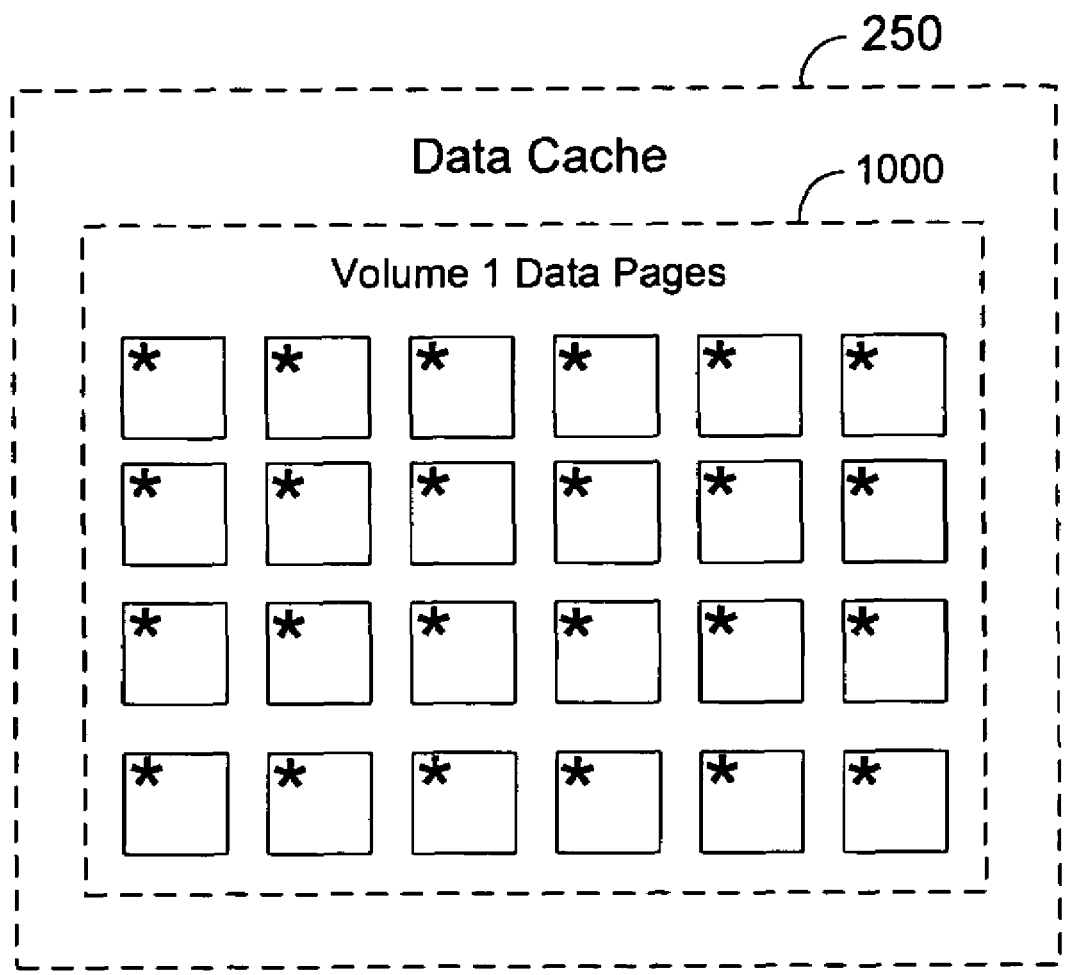
FIG. 10 illustrates modified data pages of a data volume in a data cache according to some embodiments.

FIG. 10 illustrates data cache 250 of I/O buffer cache 114 after designation of the data pages as modified in S609. Data cache 250 may include data pages other than those shown in FIG. 10. Also, both data cache 250 and volume 1 data pages 1000 are circumscribed with dotted lines to indicate that they do not necessarily occupy contiguous memory addresses.

Each data page in the cache that is designated as modified is written at S610 to a respective location in one or more other data volumes of the data area. DBMS 112 may utilize the above-described shadow memory feature and free block management component at S610 to automatically write the modified pages of cache 114 to data volumes 2 or 3 of data area 205. A converter page is then updated at S611 for each of the data pages written at S610. Each of the updated converter pages associates one of the written data pages with the location to which it was written at S610.

Figure 11:
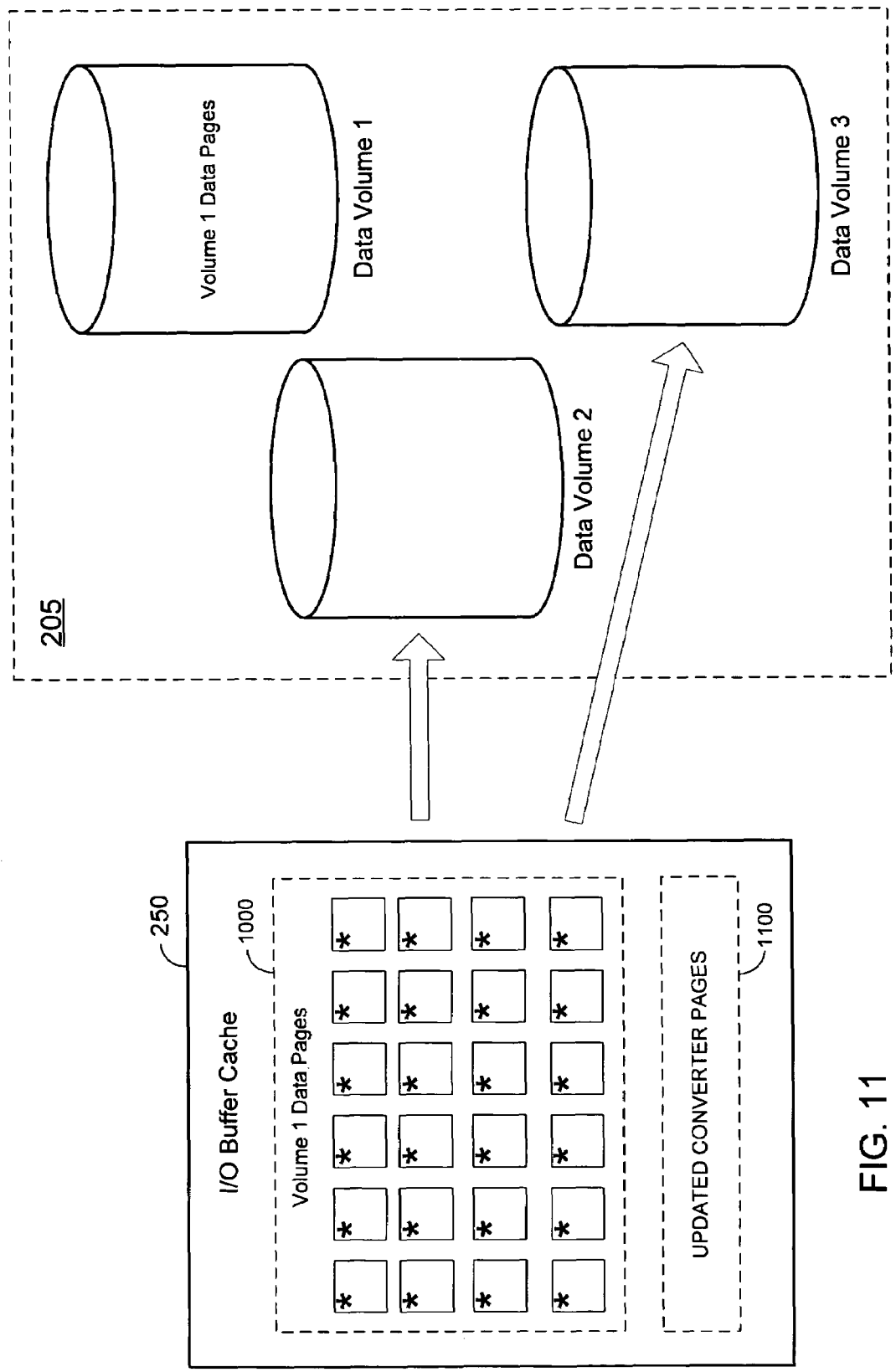
FIG. 11 illustrates writing of modified data pages to respective locations of data volumes according to some embodiments.

FIG. 11 illustrates S610 and S611 according to some embodiments. Volume 1 data pages 1000 are written to data volume 2 and data volume 3, and I/O buffer cache 114 stores updated converter pages 1100 reflecting the new locations of data pages 1000. FIG. 12 illustrates portions of two of updated converter pages 1100 according to some embodiments.

Converter page 1276 is an updated version of converter page 976 of FIG. 9. Converter page 976 associates page number 111 with block 300 of data volume 1. Accordingly, page number 111 is written to a location of data volumes 2 or 3 at S610. Next, at S611, converter page 976 is updated to reflect the new location (i.e., block 504 of data volume 2) of page number 111. Updated converter page 1278 corresponds similarly to converter page 978 of FIG. 9. As shown, both of pages 1276 and 1278 are designated as modified due to their updating at S611.

At S612, each of the updated converter pages of the cache is updated to indicate a respective location in one or more other data volumes. The respective location of an updated converter page indicates where the converter page is to be subsequently written. Again, the free block management component of DBMS 112 may ensure that the converter pages are updated at S612 to indicate only locations in data volumes 2 and 3 of data area 205.

Converter pages 1376 and 1378 of FIG. 13 are updated versions of converter pages 1276 and 1278 according to some embodiments of S612. Each of converter pages 1376 and 1378 indicates a new block address of data volume 2 or data volume 3. The present example assumes that S612 occurs during a savepoint, therefore a version number of converter pages 1276 and 1278 is also updated to reflect execution of the savepoint.

Figure 14:
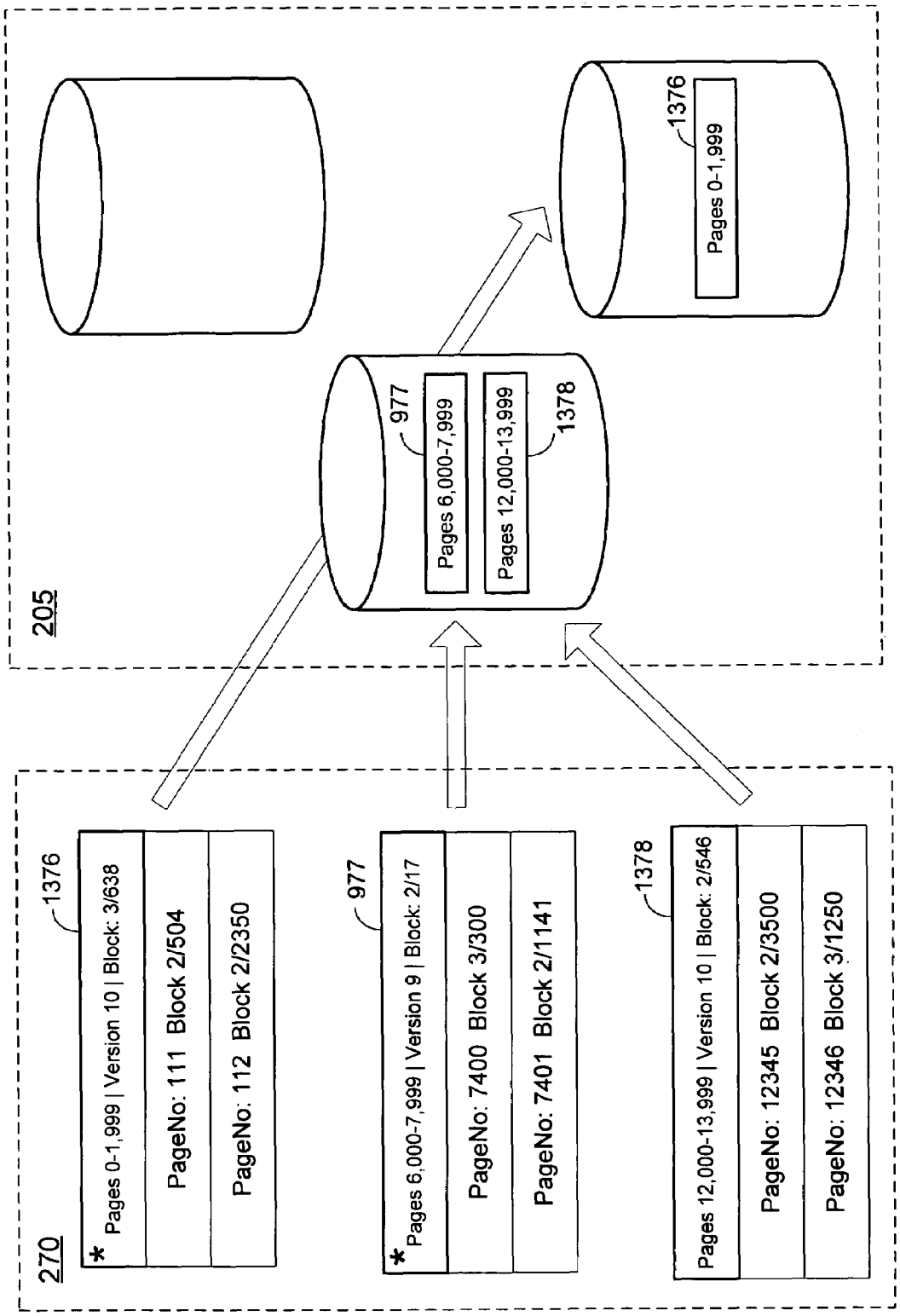
FIG. 14 illustrates writing of updated converter pages to their new locations according to some embodiments.

The updated converter pages of the cache are written to their indicated locations in the one or more other data volumes at S613. FIG. 14 illustrates writing the converter pages to their indicated locations according to some embodiments of S613. FIG. 14 also shows that the blocks of data area 205 including the "last known good" versions of the written converter pages have been freed at the completion of the savepoint.

A converter index page is updated at S614 for each of the converter pages written at S613. The converter index pages are updated to associate the written converter pages with their new locations in the data area. This updating may allow DBMS 112 to locate the converter pages in data area 205 at a next restart.

Next, at S615, it is determined that the data volume to be deleted includes a restart page. A restart page may store information that a database system requires to restart a database. The restart page may be updated at each savepoint.

According to some implementations, a restart page is located in a data area at block 1 of data volume 1. FIG. 15A illustrates data volumes 1 through 3 according to some embodiments in which the restart page is located in a data area at block 1 of data volume 1. In such implementations, the determination at S615 may comprise determining that the data volume to be deleted is data volume 1 of the data area. Block 0 of each illustrated data volume includes an IOMan_Info page, to be discussed in detail below.

The restart page is moved to a location in one of the other data volumes at S616. FIG. 15B shows an example in which the restart page is moved to a block of data volume 3. The database system records the new location of the restart page by modifying a page of a non-deleted data volume at S617 to indicate the new location.

Figure 16A:
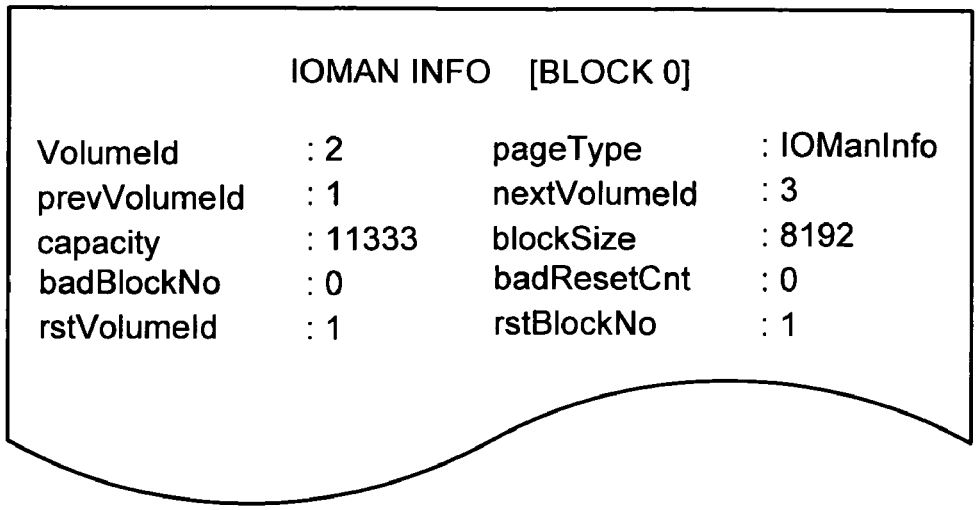
FIG. 16A illustrates an I/O management page of a data volume prior to deletion of another data volume according to some embodiments.
Figure 16B:
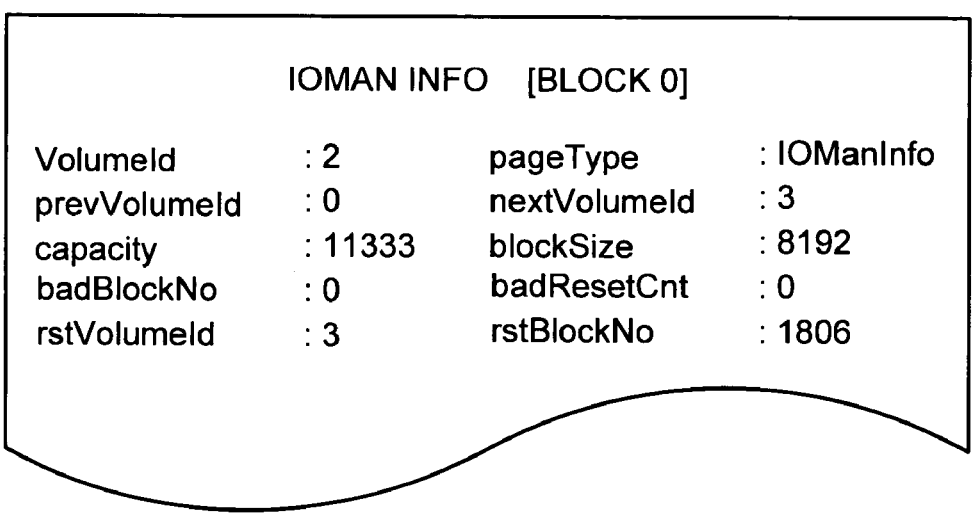
FIG. 16B illustrates an I/O management page of a data volume after deletion of another data volume according to some embodiments.

FIG. 16A illustrates a page to be modified according to some embodiments of S617. IOMan_Info page 1500 is located at block 0 of data volume 2. Prior to S617, variables rstVolumeId and rstBlockNo of page 1500 indicate that the restart page is located at block 1 of data volume 1. FIG. 16B illustrates IOMan_Info page 1510 after S617. As shown, variables rstVolumeId and rstBlockNo of page 1510 indicate that the restart page is located at block 1806 of data volume 3. According to some embodiments, the IOMan_Info page of the "new" first data volume in a data area is modified at S617 to indicate the new location of the restart page.

A data volume linkage associated with the data area is modified at S618 according to some embodiments. Flow may proceed directly to S618 from S614 if the data volume to be deleted does not include a restart page. Again referring to FIG. 16A, variables prevVolumeId and nextVolumeId of page 1500 specify a data linkage of the data area by indicating a previous and next data volume of the subject data area. The data linkage may be modified by updating variables prevVolumeId and nextVolumeId as shown in page 1510 to reflect the deletion of data volume 1 illustrated in FIG. 15B.

Next, at S619, a configuration file associated with the data area is modified. The modification reflects deletion of the subject data volume. FIGS. 17A and 17B illustrate such a configuration file before and after S619 according to some embodiments. Configuration file 1700 may be stored among configuration files 235 of database 113.

As shown, configuration file 1700 specifies a logical identifier DATA_VOLUME_NAME_001 for data volume 1 and associates the identifier with a physical location. After deletion of the data volume according to process 600, configuration file 1700 may be modified at S619 to create configuration file 1710. Configuration file 1710 is identical to file 1700 except for the deletion of information related to the deleted data volume.

The embodiments described herein are solely for the purpose of illustration. Those skilled in the art will recognize other embodiments may be practiced with modifications and alterations limited only by the claims.

What is claimed is:

1. A method for managing a data volume of a data area, the method comprising:
    storing a plurality of data pages into a cache, wherein each of the stored plurality of data pages is a copy of a respective one of a plurality of data pages of the data volume;
    preventing writing of data pages to the data volume;
    designating each of the plurality of data pages stored in the cache as modified with respect to a respective data page stored in the data volume, wherein each one of a plurality of the data pages stored in the cache is identical to the respective data page stored in the data volume when the designating of that one as modified with respect to the respective data page stored in the data volume is initiated;
    writing all data pages in the cache that are designated as modified to a respective location in one or more other data volumes of the data area;
    for each of the written data pages, updating a converter page of the cache to associate the written data page with its respective location in the one or more other data volumes;
    identifying a plurality of converter pages of the cache that are associated with respective converter pages of the data volume;
    designating the plurality of converter pages as modified;
    writing all converter pages in the cache that are designated as modified to a respective location in the one or more other data volumes of the data area; and
    updating each of the written converter pages in the cache to indicate its respective location in the one or more other data volumes of the data area.

2. A method according to claim 1, wherein storing the plurality of data pages comprises:
    identifying the plurality of data pages of the data volume based on a plurality of converter pages of the cache that associate each of the plurality of data pages with a respective location in the data volume; and
    for each of the plurality of data pages, determining if the data page is stored in the cache, and, if the data page is not stored in cache, reading the data page from the data volume and storing the data page into the cache.

3. A method according to claim 1, further comprising:
for each of the written converter pages, updating a converter index page of the data area to associate the written converter page with its respective location in the one or more other data volumes.

4. A method according to claim 1, further comprising:
for each of the updated converter pages, further updating the converter page to indicate a respective location in the one or more other data volumes of the cache;
writing each of the updated converter pages to its indicated respective location in the one or more other data volumes; and
designating locations of the plurality of data pages in the data volume as free.

5. A method according to claim 4, further comprising:
for each of the written updated converter pages, updating a converter index page of the data area to associate the written updated converter page with its indicated respective location in the one or more other data volumes.

6. A method according to claim 1, further comprising:
determining that the data volume includes a restart page;
moving the restart page to a location in the one or more other data volumes; and
modifying a page of one of the one or more other data volumes to indicate the location to which the restart page was moved.

7. A method according to claim 1, wherein the designating each of the plurality of data pages stored in the cache as modified with respect to a respective data page stored in the data volume comprises:
designating, during the preventing writing of data pages to the data volume, each of the plurality of data pages stored in the cache as modified with respect to the respective data page stored in the data volume.

8. A method according to claim 1, wherein the preventing writing of data pages to the data volume comprises:
designating the data volume as read only.

9. A method according to claim 1, further comprising:
not writing the data pages designated as modified to the respective data page stored in the data volume.

10. A method according to claim 7, wherein the preventing writing of data pages to the data volume comprises designating the data volume as read only and wherein the method further comprises not writing the data pages designated as modified to the respective data page stored in the data volume.

11. An apparatus storing program code to manage a data volume of a data area, the program code comprising:
code to store a plurality of data pages into a cache, wherein each of the stored plurality of data pages is a copy of a respective one of a plurality of data pages of the data volume;
code to prevent writing of data pages to the data volume;
code to designate each of the plurality of data pages stored in the cache as modified with respect to a respective data page stored in the data volume, wherein each one of a plurality of the data pages stored in the cache is identical to the respective data page stored in the data volume when the designation of that one as modified with respect to the respective data page stored in the data volume is initiated;
code to write all data pages in the cache that are designated as modified to a respective location in one or more other data volumes of the data area;
code to update, for each of the written data pages, a converter page of the cache to associate the written data page with its respective location in the one or more other data volumes;
code to further update, for each of the updated converter pages, the converter page to indicate a respective location in the one or more other data volumes of the cache;
code to write each of the updated converter pages to its indicated respective location in the one or more other data volumes; and
code to designate locations of the plurality of data pages in the data volume as free.

12. An apparatus according to claim 11, wherein the code to store the plurality of data pages comprises:
code to identify the plurality of data pages of the data volume based on a plurality of converter pages of the cache that associate each of the plurality of data pages with a respective location in the data volume; and
code to determine, for each of the plurality of data pages, if the data page is stored in the cache, and, if the data page is not stored in cache, code to read the data page from the data volume and to store the data page into the cache.

13. An apparatus according to claim 11, the program code further comprising:
code to identify a plurality of converter pages of the cache that are associated with respective converter pages of the data volume;
code to designate the plurality of converter pages as modified;
code to write all converter pages in the cache that are designated as modified to a respective location in the one or more other data volumes of the data area; and
code to update each of the written converter pages in the cache to indicate its respective location in the one or more other data volumes of the data area.

14. An apparatus according to claim 13, the program code further comprising:
code to update, for each of the written converter pages, a converter index page of the data area to associate the written converter page with its respective location in the one or more other data volumes.

15. An apparatus according to claim 11, the program code further comprising:
code to update, for each of the written updated converter pages, a converter index page of the data area to associate the written updated converter page with its indicated respective location in the one or more other data volumes.

16. An apparatus according to claim 11, the program code further comprising:
code to determine that the data volume includes a restart page;
code to move the restart page to a location in the one or more other data volumes; and
code to modify a page of one of the one or more other data volumes to indicate the location to which the restart page was moved.

17. An apparatus according to claim 11, wherein the code to designate each of the plurality of data pages stored in the cache as modified with respect to a respective data page stored in the data volume comprises:
code to designate, during the prevention of writing of data pages to the data volume, each of the plurality of data pages stored in the cache as modified with respect to the respective data page stored in the data volume.

18. A system comprising:
a database comprising:
a data area;
a data volume of the data area, the data volume comprising a plurality of data pages; and
one or more other data volumes of the data area;

a cache to store data pages and converter pages; and a database management system in communication with the database and the cache, the database management system to:

store the plurality of data pages into the cache, wherein each of the stored plurality of data pages is a copy of a respective one of a plurality of data pages of the data volume;

prevent writing of data pages to the data volume;

designate each of the plurality of data pages stored in the cache as modified with respect to a respective data page stored in the data volume, wherein each one of a plurality of the data pages is identical to the respective data page stored in the data volume when the designation of that one as modified with respect to the respective data page stored in the data volume is initiated;

write all data pages in the cache that are designated as modified to a respective location in the one or more other data volumes;

update, for each of the written data pages, a converter page of the cache to associate the written data page with its respective location in the one or more other data volumes;

identify a plurality of converter pages of the cache that are associated with respective converter pages of the data volume;

designate the plurality of converter pages as modified;

write all converter pages in the cache that are designated as modified to a respective location in the one or more other data volumes of the data area; and update each of the written converter pages in the cache to indicate its respective location in the one or more other data volumes of the data area.

19. A system according to claim 18, wherein storage of the plurality of data pages comprises:

identification of the plurality of data pages of the data volume based on a plurality of converter pages of the cache that associate each of the plurality of data pages with a respective location in the data volume; and determination, for each of the plurality of data pages, of whether the data page is stored in the cache, and, if the data page is not stored in cache, reading of the data page from the data volume and storage of the data page into the cache.

20. A system according to claim 18, the database management system further to:

update, for each of the written converter pages, a converter index page of the data area to associate the written converter page with its respective location in the one or more other data volumes.

21. A system according to claim 18, the database management system further to:

update, for each of the updated converter pages, the converter page to indicate a respective location in the one or more other data volumes of the cache;

write each of the updated converter pages to its indicated respective location in the one or more other data volumes; and designate locations of the plurality of data pages in the data volume as free.

22. A system according to claim 21, the database management system further to:

update, for each of the written updated converter pages, a converter index page of the data area to associate the written updated converter page with its indicated respective location in the one or more other data volumes.

23. A system according to claim 18, the database management system further to:

determine that the data volume includes a restart page;

move the restart page to a location in the one or more other data volumes; and modify a page of one of the one or more other data volumes to indicate the location to which the restart page was moved.

24. A system according to claim 18, wherein the designation each of the plurality of data pages stored in the cache as modified with respect to a respective data page stored in the data volume comprises:

designation, during the prevention of writing of data pages to the data volume, of each of the plurality of data pages stored in the cache as modified with respect to a respective data page stored in the data volume.

25. A method for managing a data volume of a data area, the method comprising:

storing a plurality of data pages of the data volume into a cache;

preventing writing of data pages to the data volume;

designating each data page of the stored data pages as modified with respect to a respective data page of the data pages of the data volume regardless of whether the data page of the stored data pages is an identical version or a modified version of the respective data page of the data pages of the data volume;

writing each of the stored data pages that is designated as modified to a respective location in one or more other data volumes of the data area;

for each data page of the written data pages, updating a converter page of the cache to associate the written data page with its respective location in the one or more other data volumes;

for each of the updated converter pages, further updating the converter page to indicate a respective location in the one or more other data volumes of the cache;

writing each of the updated converter pages to its indicated respective location in the one or more other data volumes; and designating locations of the plurality of data pages in the data volume as free.

26. A method according to claim 25, wherein the designating each data page of the stored data pages as modified with respect to a respective data page of the data pages of the data volume comprises:

designating, during the preventing writing of data pages to the data volume, each data page of the stored data pages as modified with respect to a respective data page of the data pages of the data volume.

* * * * *